US006978548B2

(12) United States Patent
Whited et al.

(10) Patent No.: US 6,978,548 B2
(45) Date of Patent: Dec. 27, 2005

(54) POWER OPERATED ROTARY KNIFE

(75) Inventors: Jeffrey A. Whited, Amherst, OH (US); Robert L. Leimbach, Wakeman, OH (US); Raymond Herrmann, Westlake, OH (US)

(73) Assignee: Bettcher Industries, Inc., Vermilion, OH (US)

( * ) Notice: Subject to any disclaimer, the term of this patent is extended or adjusted under 35 U.S.C. 154(b) by 0 days.

(21) Appl. No.: 10/820,231

(22) Filed: Apr. 7, 2004

(65) Prior Publication Data

US 2004/0187316 A1 Sep. 30, 2004

Related U.S. Application Data

(63) Continuation of application No. 10/070,402, filed as application No. PCT/US00/27488 on Oct. 5, 2000, now Pat. No. 6,751,872.

(60) Provisional application No. 60/157,929, filed on Oct. 6, 1999.

(51) Int. Cl.[7] .......... A22C 17/00
(52) U.S. Cl. .......... 30/276
(58) Field of Search .......... 30/276, 340; 452/133, 452/137, 132; 451/45

(56) References Cited

U.S. PATENT DOCUMENTS 3,349,485 A 10/1967 Bettcher
4,178,683 A 12/1979 Bettcher
4,516,323 A 5/1985 Bettcher et al.
4,575,937 A 3/1986 McCullough
4,637,140 A 1/1987 Bettcher
4,854,046 A 8/1989 Decker et al.
4,894,915 A 1/1990 Decker et al.
5,230,154 A 7/1993 Decker et al.

FOREIGN PATENT DOCUMENTS

EP 0 974 431 A1 1/2000
EP 0 482 351 A2 9/2001

OTHER PUBLICATIONS

PCT International Preliminary Examination Report, dated Nov. 1, 2001.
PCT International Search Report, dated Jul. 24, 2001.

*Primary Examiner*—Charles Goodman
(74) *Attorney, Agent, or Firm*—Watts Hoffmann Co., L.P.A.

(57) ABSTRACT

A rotary knife comprising, an annular blade having a central axis, a blade supporting head assembly supporting the blade for rotation about the axis, a manually grippable handle assembly connected to the head assembly, and a flex shaft drive transmission for driving the blade about the axis. The handle assembly comprises a core, a hand grip surrounding the core, and a connector unit that secures the hand grip to the core. The core has a first end region rigidly fixed with respect to the head assembly and a second end region spaced from the head assembly. The core defines a drive transmission guiding channel leading toward the blade. The hand grip has a first end region proximal the blade support assembly and a second end region proximal the second core end region. The connector detachably secures the hand grip in fixed relationship with the core. The connector engages the second end regions and is detachable for enabling hand grip removal and replacement.

7 Claims, 9 Drawing Sheets

POWER OPERATED ROTARY KNIFE

This is a continuation application which claims priority from U.S. application Ser. No. 10/070,402, filed on Mar. 1, 2002 now U.S. Pat. No. 6,751,872, which claims priority from and is a 371 of International Application Serial No. PCT/US00/27488, filed on Oct. 5, 2000, which claims priority from U.S. Provisional Application No. 60/157,929, filed Oct. 6, 1999.

FIELD OF THE INVENTION

The present invention relates to a power operated rotary knife that has an improved handle assembly.

BACKGROUND OF THE INVENTION

Power operated rotary knives have been used in commercial meat processing operations to trim fat and connective tissue from meat, trim pieces of meat from bones, and to produce meat slices. Such knives are often constructed so that they are driven via a long flexible drive shaft. The knife operator wields the knife relatively freely at a meat cutting work station that is remote from the driving motor.

These power operated knives represented a major improvement over use of hand knives or knives having an integral drive motor. Knife operator fatigue was greatly reduced, enabling both increased productivity and greater knife operator comfort. Nevertheless knife operator fatigue was not eliminated. Some knives incorporated "take-with" handles that were sized to fit the hands of knife operators using the knives. These handles could be removed from the knives and taken with the knife operator after using the knife. Take-with handles reduced fatigue because the knife operator could always use a knife with a handle that was properly sized. The handles were difficult to install in proper alignment with the knife blade.

Some previously known rotary knives were provided with steeling mechanisms. But these were not convenient to use because the knife operator had to significantly reposition the knife hand or use two hands to steel the blade.

When the blades of rotary knives must be replaced, the blade is removed from its housing on the knife. In many prior art knives, removing the blade was difficult and required the blade housing to be semi-detached from the knife in order for the blade to be removed and replaced. This required significant operator time and skill to achieve because the blade housing and associated parts had to be properly aligned for the knife to perform optimally. In other knives a special blade removal mechanism was incorporated in the knife. This increased the knife weight and added to the cost of the knives so equipped.

The drive connection between the flexible drive shaft and the blade rotating gearing was typically formed by a square cross section flex shaft end that plugged into a square opening in a drive gear. The blade drive was disconnected by pulling the flex shaft end out of the drive gear opening. The resultant engagement forces between the faces of the flex shaft end and gear opening had force components that were radially directed as well as normal to the radial components. The normal force components were effective to transmit torque and were of smaller magnitude than the respective engagement forces. Therefore, for a given amount of torque transmission, the frictional forces resisting disconnection were great because the frictional forces were proportional to the engagement force. This tended toward increased difficulty in disconnecting the blade drive.

SUMMARY OF THE INVENTION

The present invention provides a new and improved rotary knife comprising, an annular blade having a central axis, a blade supporting head assembly supporting the blade for rotation about the axis, a manually grippable handle assembly connected to the head assembly, and a flex shaft drive transmission for driving the blade about the axis.

An important feature of the invention resides in the handle assembly construction. The handle assembly comprises a core, a hand grip surrounding the core, and a connector unit that secures the hand grip to the core. The core has a first end region rigidly fixed with respect to the head assembly and a second end region spaced from the head assembly. The core defines a drive transmission guiding channel leading toward the blade. The hand grip has a first end region proximal the blade support assembly and a second end region proximal the second core end region. The connector detachably secures the hand grip in fixed relationship with the core. The connector engages the second end regions and is detachable for enabling hand grip removal and replacement.

The hand grip is provided with an alignment key element that coacts with one of a number of slots that are fixed with respect to the core and head assembly. The hand grip is manipulated to properly align it with the head assembly and the alignment key is moved into the appropriate slot before the connector secures the hand grip to the knife.

According to a preferred embodiment, the connector unit engage the core and clamps the hand grip into fixed relationship with the knife. The connector unit comprises a latching mechanism that detachably secures the drive shaft assembly to the handle assembly in a condition where the drive shaft assembly and the blade are disengaged.

According to another feature of the invention a steeling mechanism is provided that is easily accessible to the knife operator so that the operator can steel the blade without repositioning the knife hand and without the need to use two hands to accomplish the steeling procedure.

Still another feature of the invention provides for drive transmitting forces to be transmitted between blade driving gearing and a flex shaft assembly in directions that are normal the radial lines through the rotation axis. These driving forces do not have radial components and accordingly, for a given torque transmission, frictional forces resisting disconnection of the drive are minimized.

Additional features and advantages of the invention will become apparent from the following description of a preferred embodiment made with reference to the accompanying drawings, which form part of the specification.

DESCRIPTION OF THE BEST MODE CONTEMPLATED FOR PRACTICING THE INVENTION

Figure 1:
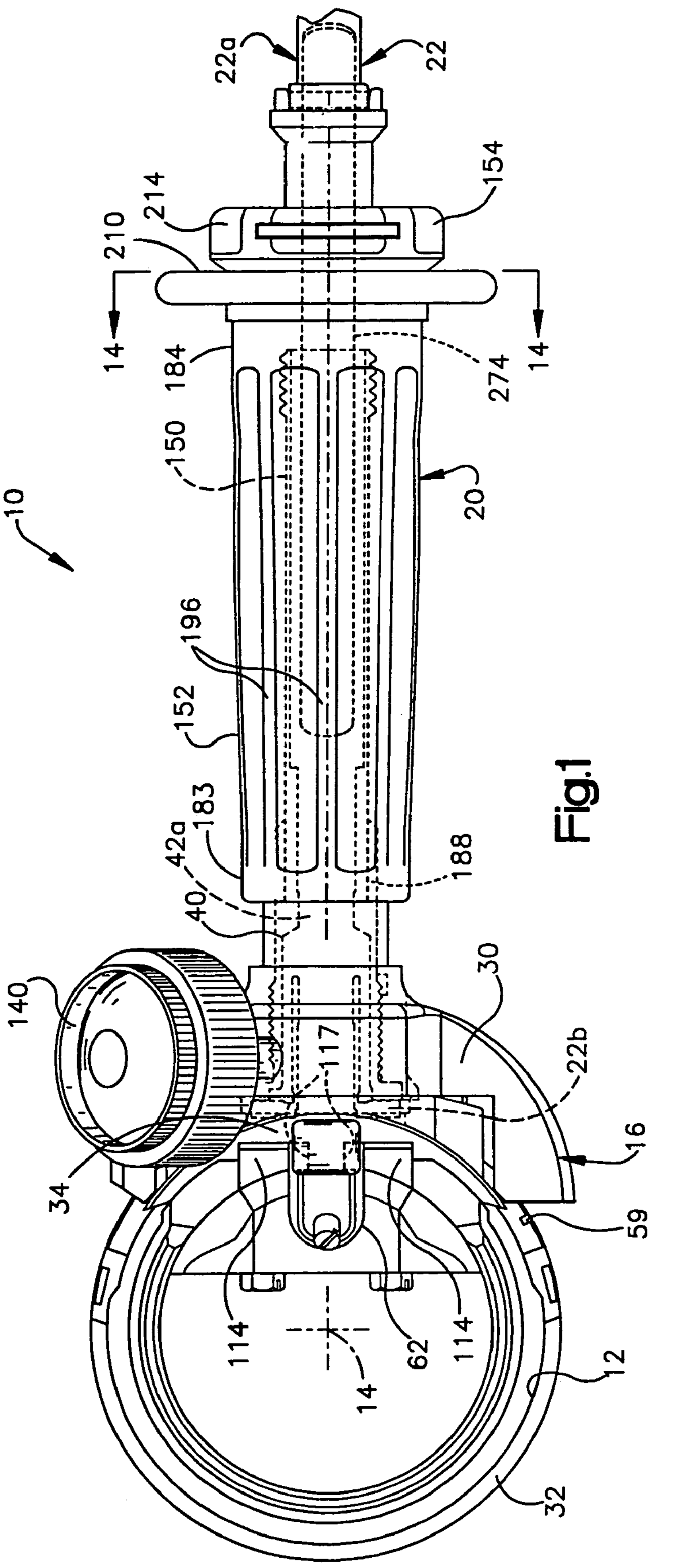
FIG. 1 is a top plan view of a knife constructed according to the invention.

A power operated rotary knife 10 embodying the invention is illustrated by the drawings. The knife 10 comprises an annular blade 12 having a central axis 14, a blade support assembly 16 Supporting the blade for rotation about the axis, a manually grippable handle assembly 20 connected to the blade support assembly, and a flex shaft drive transmission 22 for driving the blade about the axis. The flex shaft transmission 22 comprises a flex shaft assembly 22*a* (only part of which is shown) that extends through the handle assembly 20, and a blade driving output member 22*b*, that is illustrated as a pinion gear, rotatably supported in the blade support assembly and driven from the shaft assembly 22*a* to rotate the blade 12.

Figure 2:
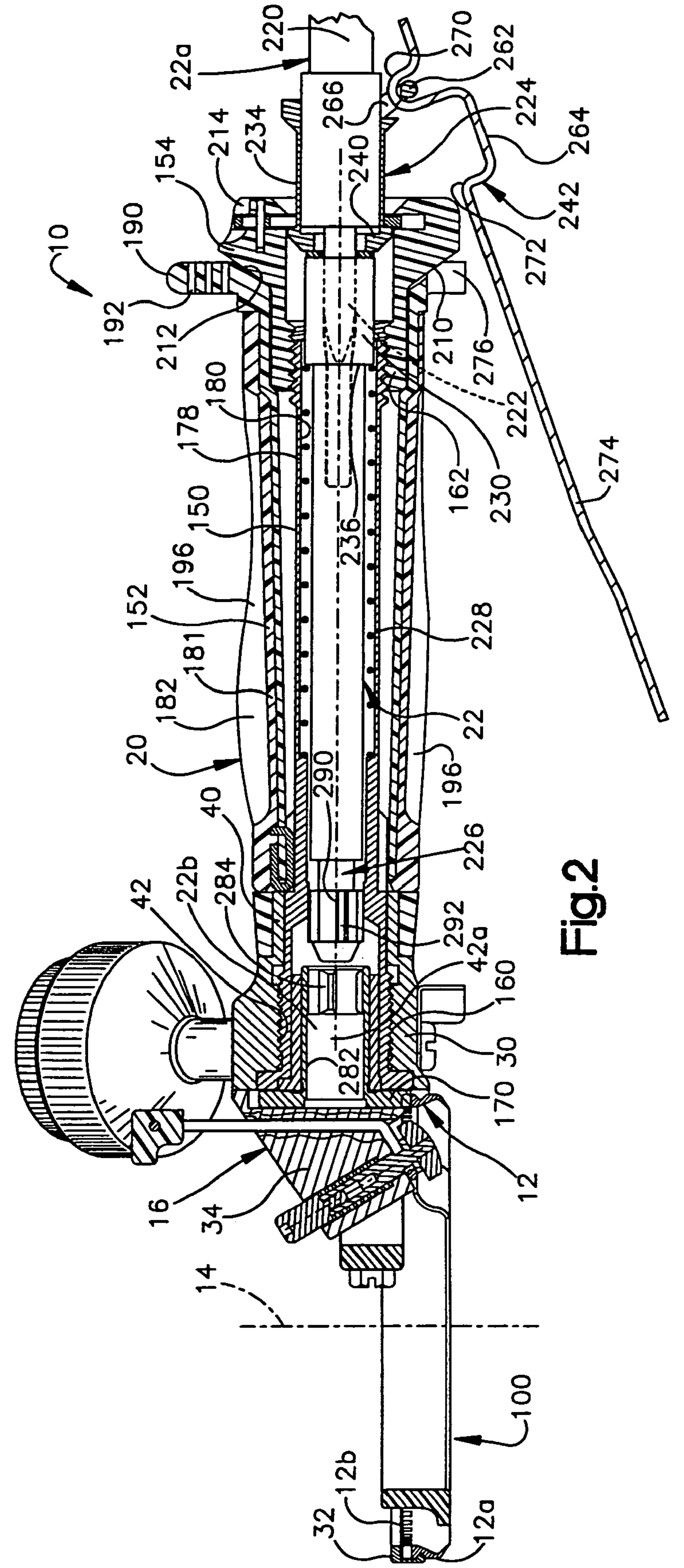
FIG. 2 is a cross sectional view seen approximately from the plane indicated by the line 2—2 of FIG. 1.
Figure 3:
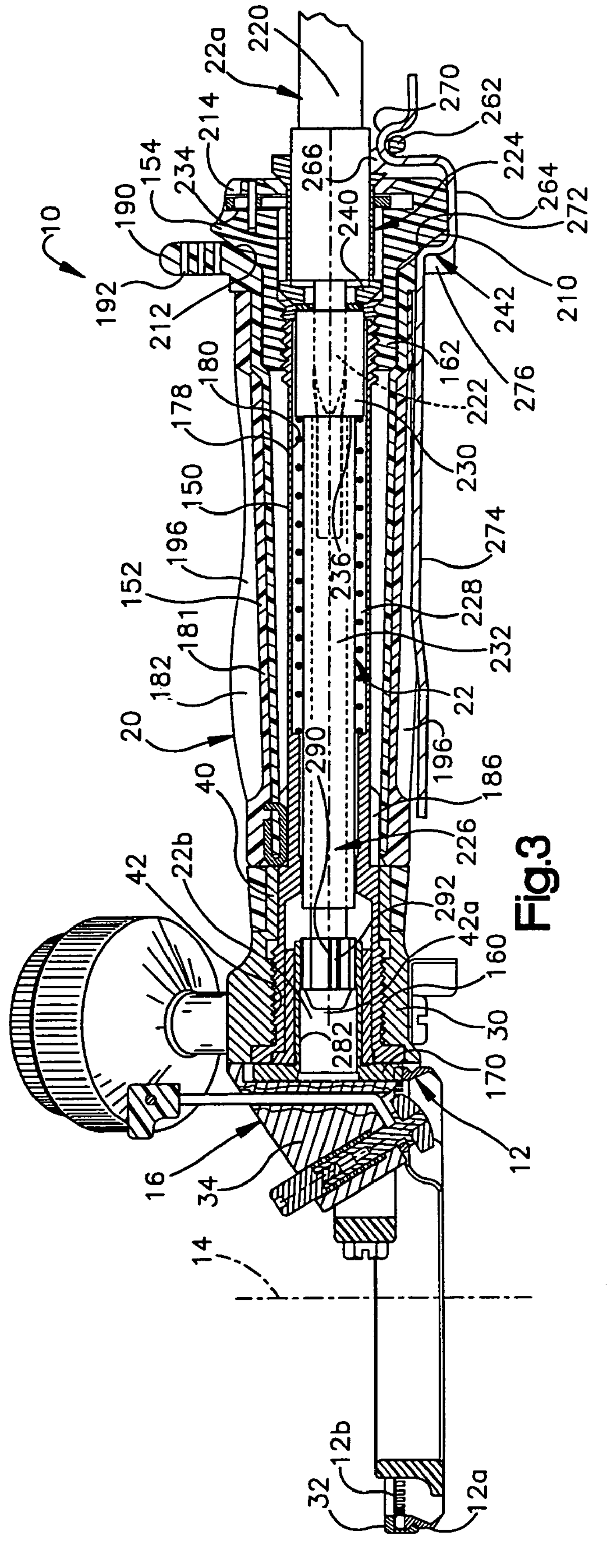
FIG. 3 is a view similar to FIG. 2 with parts illustrated in alternative positions.
Figure 4:
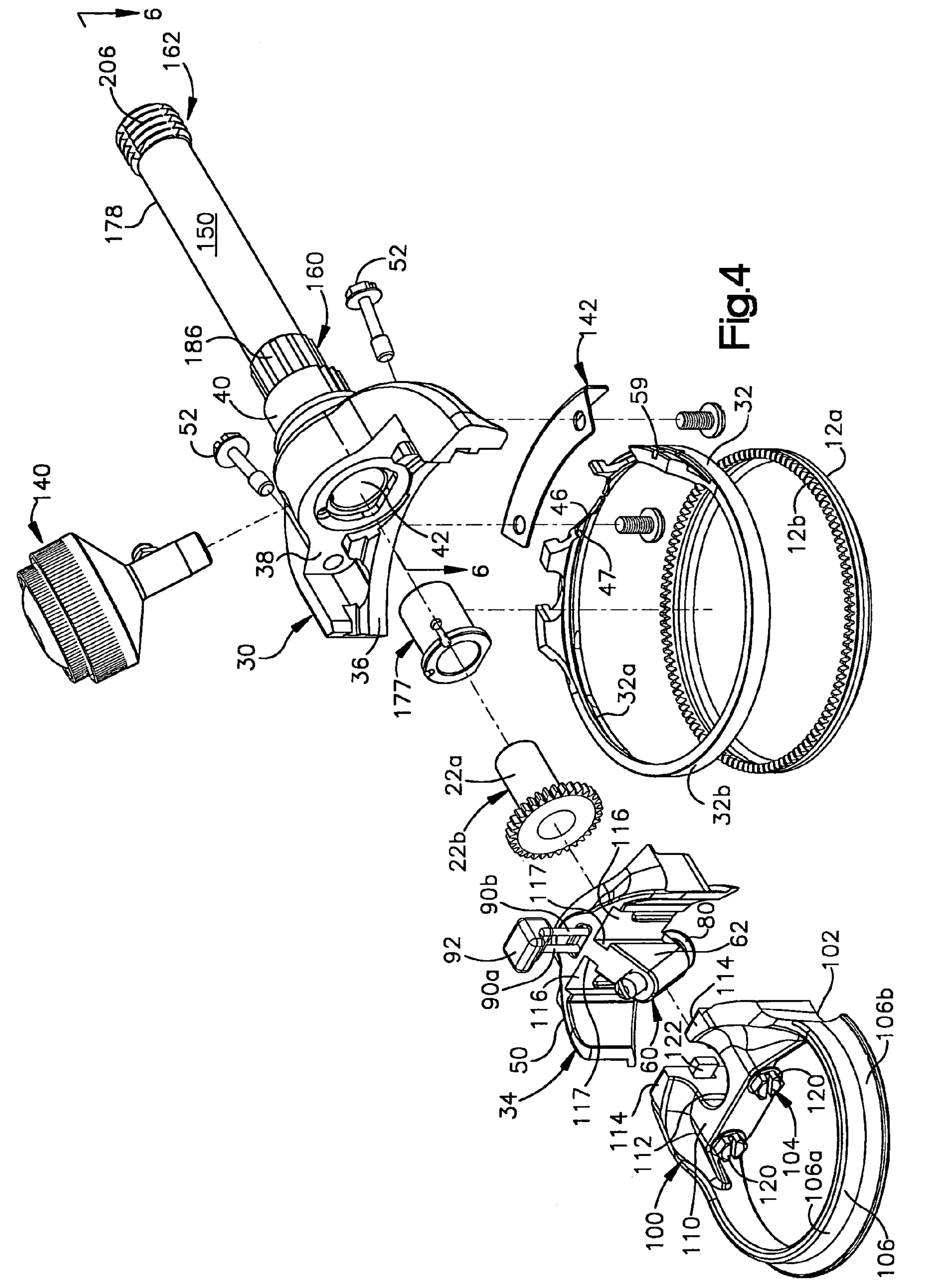
FIG. 4 is an exploded perspective view of part of the knife of FIG. 1.

The blade 12 may be of any suitable or conventional construction and includes an annular blade section 12*a* projecting from the blade support assembly 16 and an annular enlarged body section defining a ring gear 12*b* (see FIGS. 2 and 3). The gear 12*b* has axially extending teeth by which the blade 12 is driven about the axis 14 in mesh with the pinion gear 22*b*.

The blade support assembly 16 supports the blade 12 and the handle assembly 20. The blade support assembly comprises a head member 30, a blade housing 32, and a clamp assembly 34 for securing the blade and blade housing to the head member. The head member is illustrated as formed by a generally crescent shaped body having a semicircular seating region 36 confronting the blade housing, a rectilinear clamp assembly receiving socket 38 adjacent the seating region, and a boss 40 that surrounds a through bore 42 in the head member and projects oppositely from the slot and seating region.

The blade housing 32 is an annular member for receiving, and rotatably supporting, the blade 12. The blade housing is split to enable its resilient expansion for removing and replacing the blade 12. The illustrated blade housing is seated against the head member seating region 36 and positions the blade 12 so that the ring gear 12*b* is accurately positioned for being driven from the pinion gear 22*b*. The blade housing defines a semicircular cut-out area 46 that receives the pinion gear 22*b* when the pinion gear and ring gear 12*b* mesh.

The blade housing 32 is centered on the axis 14 and has a radially inner blade supporting section 32*a* (FIG. 8), a radially outer face 32*b* (FIG. 9) extending circumferentially about the body, and a body mounting structure 43 extending circumferentially partially about the body on opposite sides of the body split and disposed between the head member 30 and the clamp assembly 34.

Referring to FIGS. 7–10, the body mounting structure 43 defines first and second axially extending (i.e. parallel to the axis 14) projections 43*a* disposed on one side of the split, and third and fourth axially extending projections 43*b* disposed on the other side of the split. Each projection extends axially from the blade supporting section to a distal projection end. Each projection defines a radially outwardly facing, circumferentially extending bearing face 44 confronting the head member 30, and a circumferentially extending radially outwardly opening groove 45 extending between the respective bearing face 44 and the radially outer face 32*b*. The projection bearing faces 44 extend parallel to the radially outer face 32*b*. The radially outer face 32*b* defines a housing body bearing face portion 46*a* (FIG. 7) extending circumferentially along the body mounting structure 43 and confronting the head member. The bearing face 46*a* is separated from the bearing faces 44 by the groove 45.

A first housing mounting slot is defined between the first and second projections 43*a*. The first mounting slot opens between the distal ends of the first and second projections and extends axially in the mounting structure to a location substantially adjacent the radially outer face 32*b*. A second housing mounting slot is defined between the third and fourth projections. The second mounting slot opens between the distal ends of the third and fourth projections and extends axially in the mounting structure to a location substantially adjacent the radially outer face 32*b*.

A radially inner bearing face 47 (FIG. 8) extends circumferentially along the radially inner side of the body mounting structure 43 and confronts the clamp assembly 34. The inner bearing face 47 is located axially between the blade supporting section 32*a* and the distal projection ends. The inner bearing face is axially narrow compared to the axial extent of either the housing body or the projecting bearing faces. The inner bearing face 47 is constructed and arranged so that clamping force applied to the inner bearing face is transmitted radially and axially through the blade housing to the housing body bearing face 46*a* and the projection bearing faces 44 for securely clamping the blade housing in place.

The clamp assembly 34 firmly maintains the blade housing seated against the blade support assembly seating region 36 to rigidly position the blade 12 while covering the pinion gear, which might otherwise be exposed to meat, fat, bone chips, etc. that could adversely effect the gearing. The clamp assembly 34 comprises a clamp body 50, and clamping screws 52. (See FIGS. 1–5, 11 and 12). The clamp body 50 defines a semicircular recess 54 confronting the head member for receiving the pinion gear 22*b*, bearing ridges 56 that engage the blade housing 32 along the inner bearing face 47 on respective opposite sides of the housing body split, and clamping screw receiving bosses 58 that project into the socket 38 between the projections 43*a* and 43*b*, respectively.

The clamping screws 52 extend through respective holes in the rear side of the head member 30 and into respective tapped holes in the bosses 58. The screws are tightened to clamp the body 50 against the blade housing 32 and the head member. Each bearing ridge 56 exerts force on the blade housing that depends on the tension in the respective adjacent clamping screw 52. If one of the clamping screws is unscrewed slightly, the adjacent bearing ridge exerts diminished clamping force on the blade housing 32.

Figure 8:
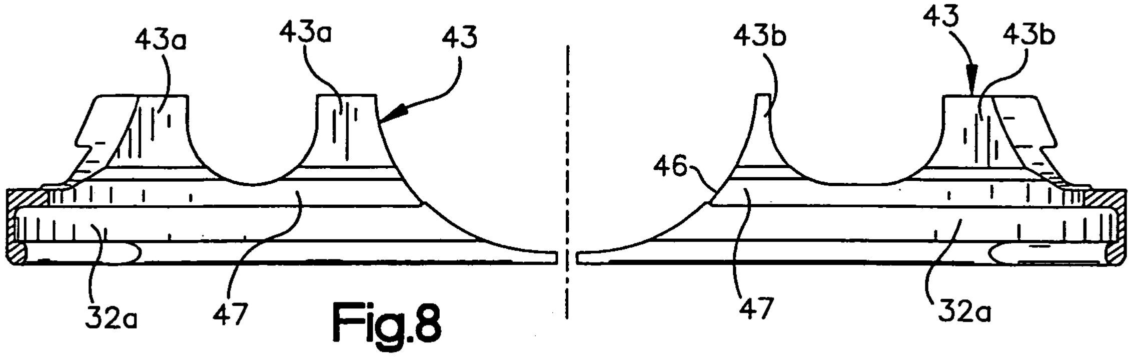
FIG. 8 is an enlarged view seen approximately from the plane indicated by the line 8—8 of FIG. 7.
Figure 9:
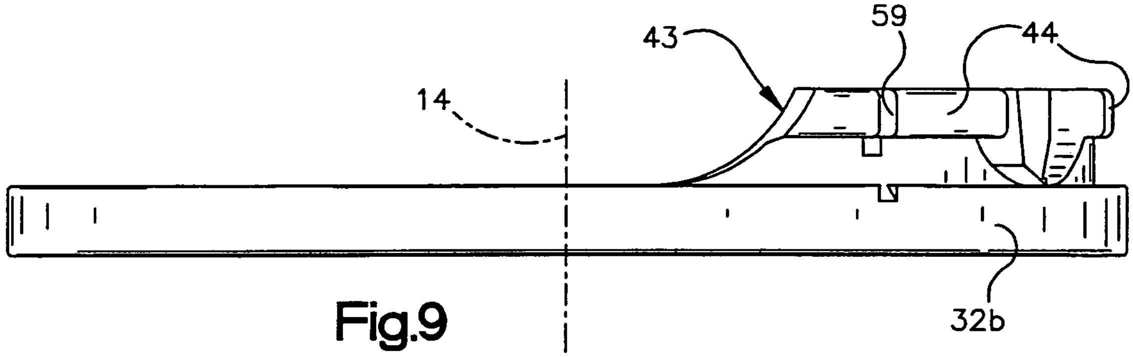
FIG. 9 is a view seen approximately from the plane indicated by the line 9—9 of FIG. 7.
Figure 10:
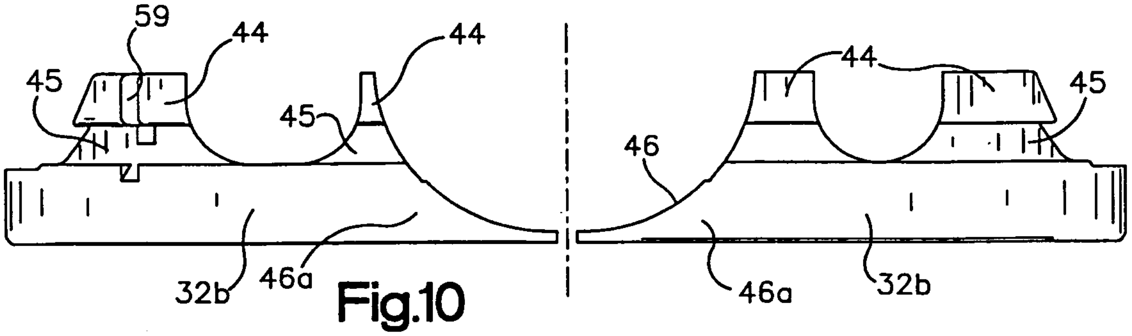
FIG. 10 is an enlarged view seen approximately from the plane indicated by the line 10—10 of FIG. 9.
Figure 11:
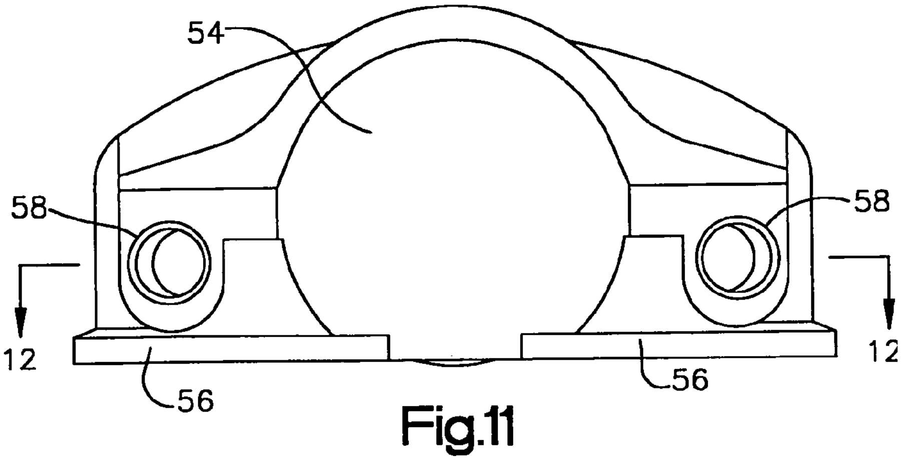
FIG. 11 is a view seen approximately from the plane indicated by the line 11—11 of FIG. 5, with parts removed.
Figure 12:
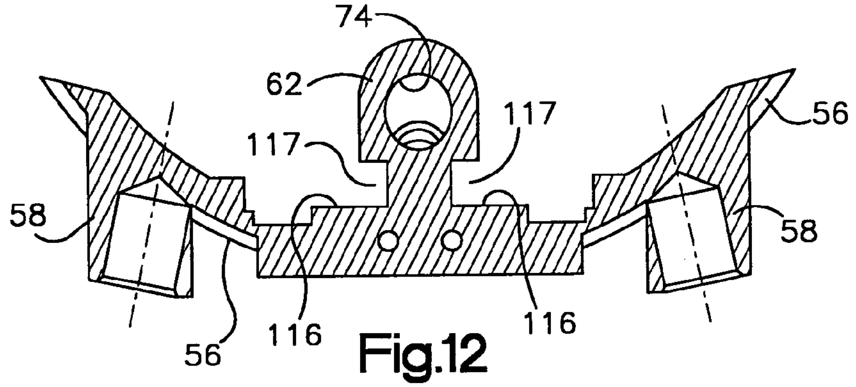
FIG. 12 is a view seen approximately from the plane indicated by the line 12—12 of FIG. 11.
Figure 13:
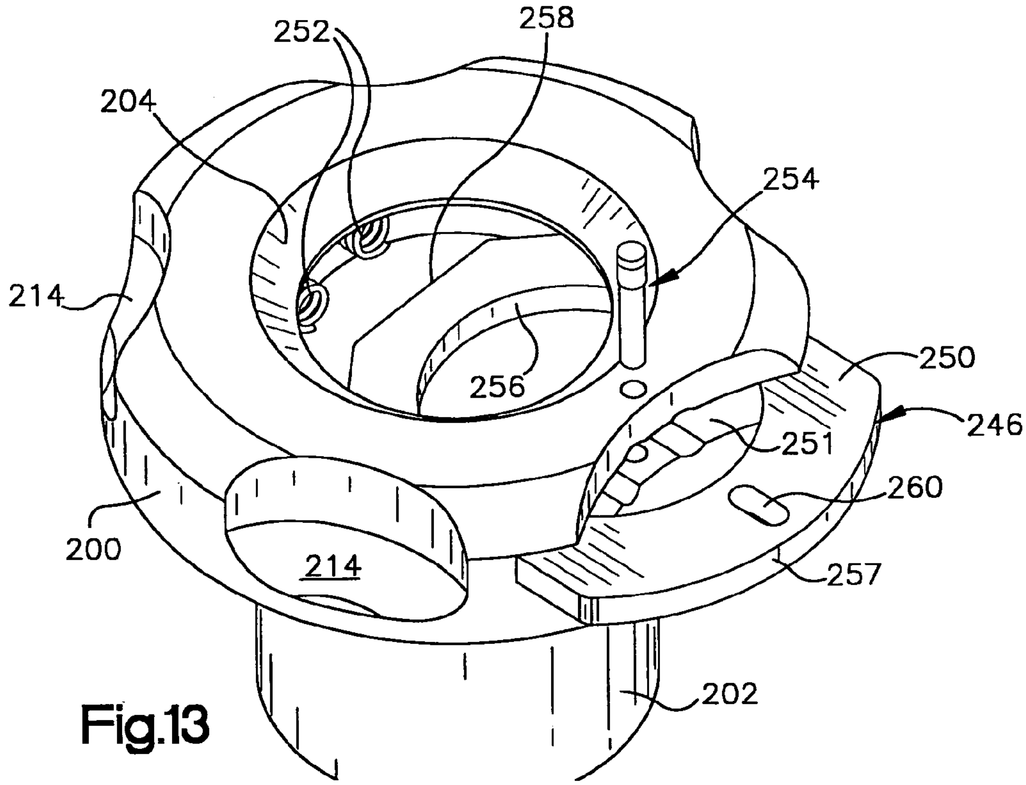
FIG. 13 is a perspective view of part of the knife shown in FIGS. 1–3.
Figure 14:
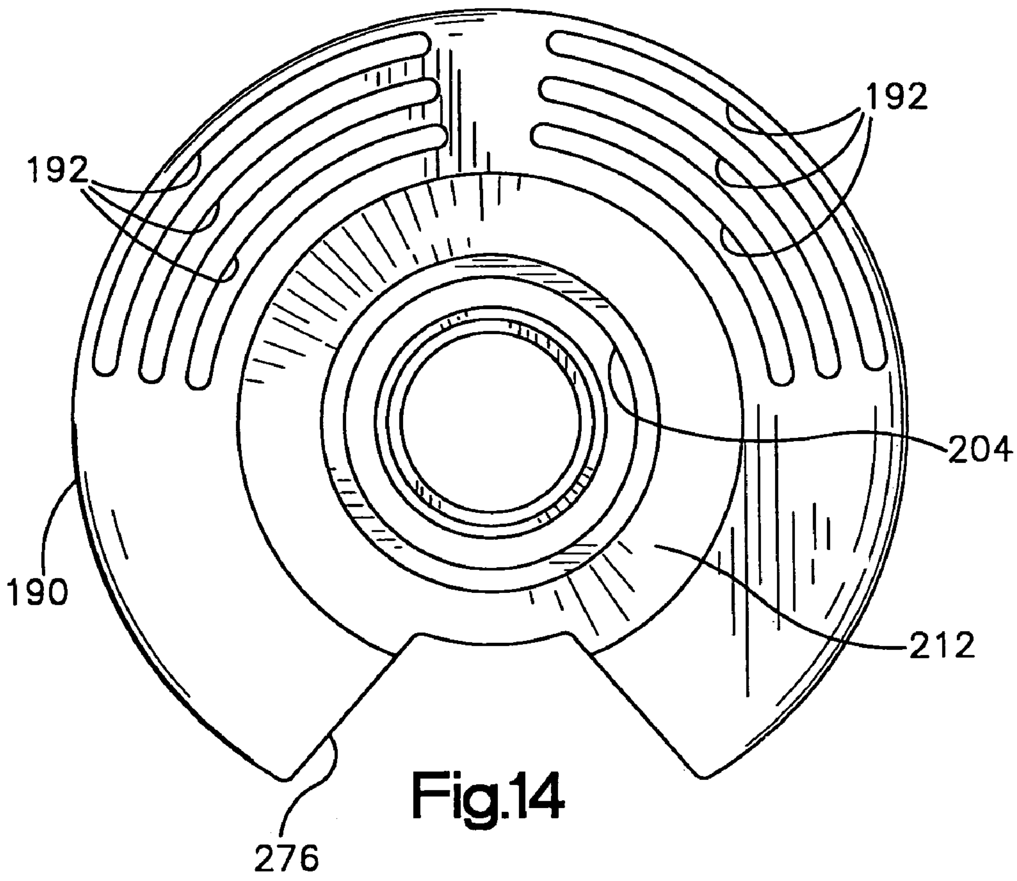
FIG. 14 is a view seen approximately from the plane indicated by the line 14—14 of FIG. 1 with parts removed; and, FIG. 15 is a view seen approximately from the plane indicated by the line 15—15 of FIG. 5.

The blade housing is formed with an expansion structure 59 that enables the housing to resiliently expand, while firmly connected to the head member, when the blade 12 is removed and replaced. In the illustrated blade housing the expansion structure 59 takes the form of a tool receiving axial slot in the blade housing outer periphery adjacent the head member. A screwdriver, or equivalent tool, may be inserted in the slot 59 and levered against the head member to resiliently expand the blade housing diameter. The ability to selectively reduce the clamping force permits removing and replacing the blade 12 by loosening only the clamping screw nearest the tool slot 59 before expanding the blade housing diameter. The blade housing thus remains firmly assembled to, and accurately positioned on, the head member during blade replacement. As shown in FIG. 8, the space between the projections 43*b* is larger than the circumferential extent of the boss 58 extending through it so that the blade housing can be expanded without engaging the boss 58.

In the illustrated knife the clamp assembly 34 carries a blade steeling mechanism 60 that is manually operated periodically to straighten the blade section edge 12*a* for maintaining its sharpness. The knife is operated to rotate the blade 12 about its axis and the knife operator moves the steel into engagement with the blade to straighten the blade as it rotates. Referring to FIGS. 2–5, the steeling mechanism 60 comprises a supporting body 62, a steel assembly 64 supported by the body 62 for movement into and away from engagement with the blade 12, a manually operated actuator 66 for shifting the steel assembly from a retracted position into engagement with the blade 12, and a return spring 68 for returning the steel assembly to its retracted position.

The steel assembly moves toward and away from engagement with the blade along a first line of action, indicated by the reference character 70. The actuator 66 moves along a second line of action 72 that is neither parallel to, nor coextending with, the first line of action. In the illustrated knife both lines of action are disposed in or adjacent a plane containing the blade axis 14 and the rotation axis of the pinion gear 22*b*. The actuator 66 is substantially centered on the head member 30 in line with the pinion gear axis 42*a* (FIG. 1) so that the actuator is equally accessible for manual operation to right and left handed knife operators. The steel line of action 70 is offset from the line 72 and spaced away from the reach of the operator's knife hand while holding the knife.

Figure 5:
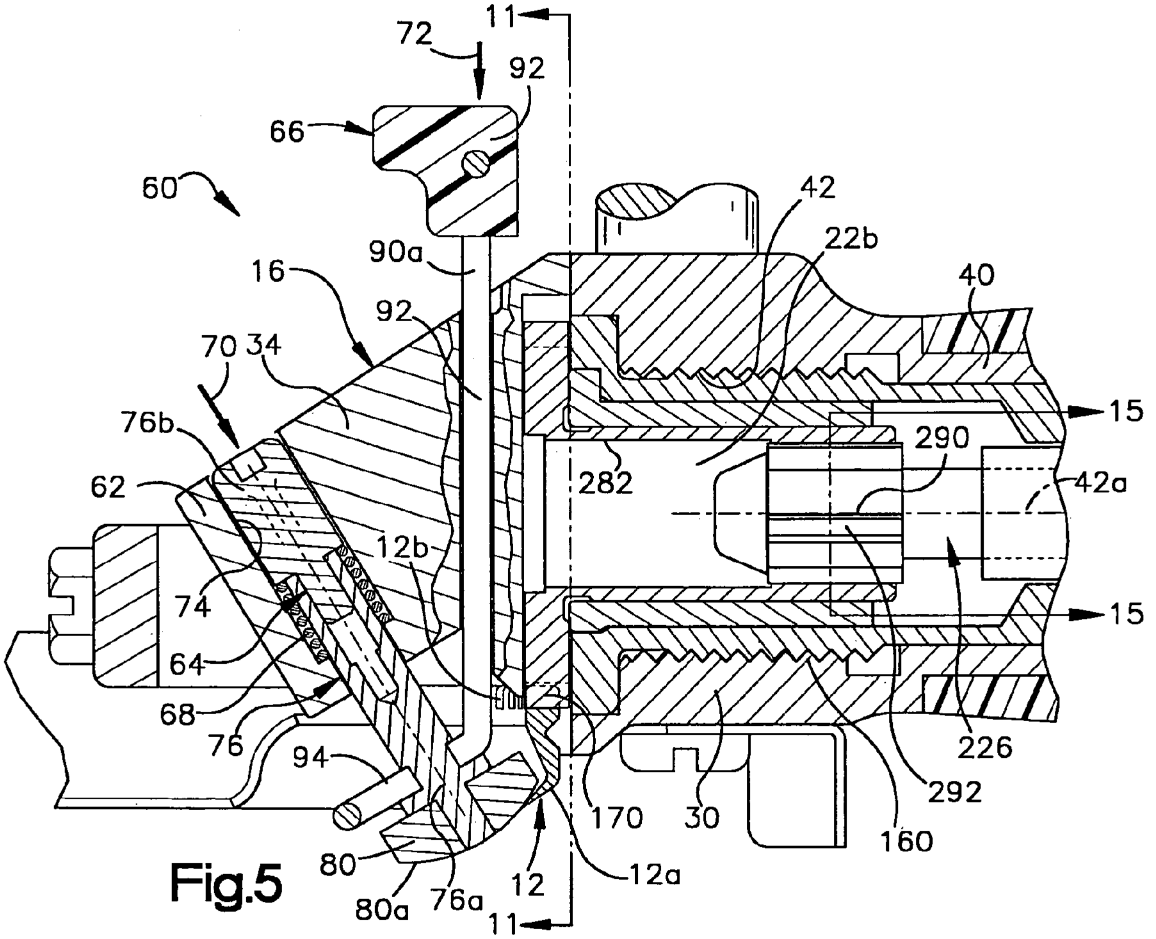
FIG. 5 is an enlarged cross sectional view of part of the knife of FIG. 2.
Figure 6:
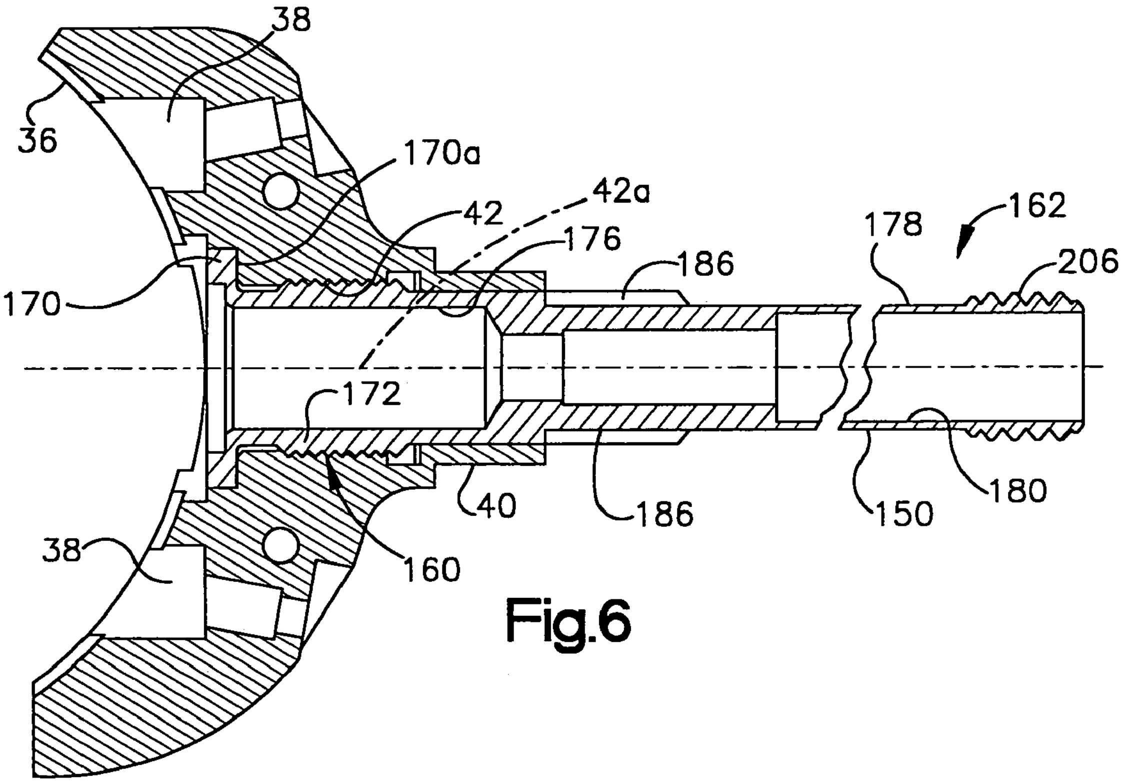
FIG. 6 is a fragmentary cross sectional view seen approximately from the plane indicated by the line 6—6 of FIG. 4 with parts illustrated in alternative positions.
Figure 7:
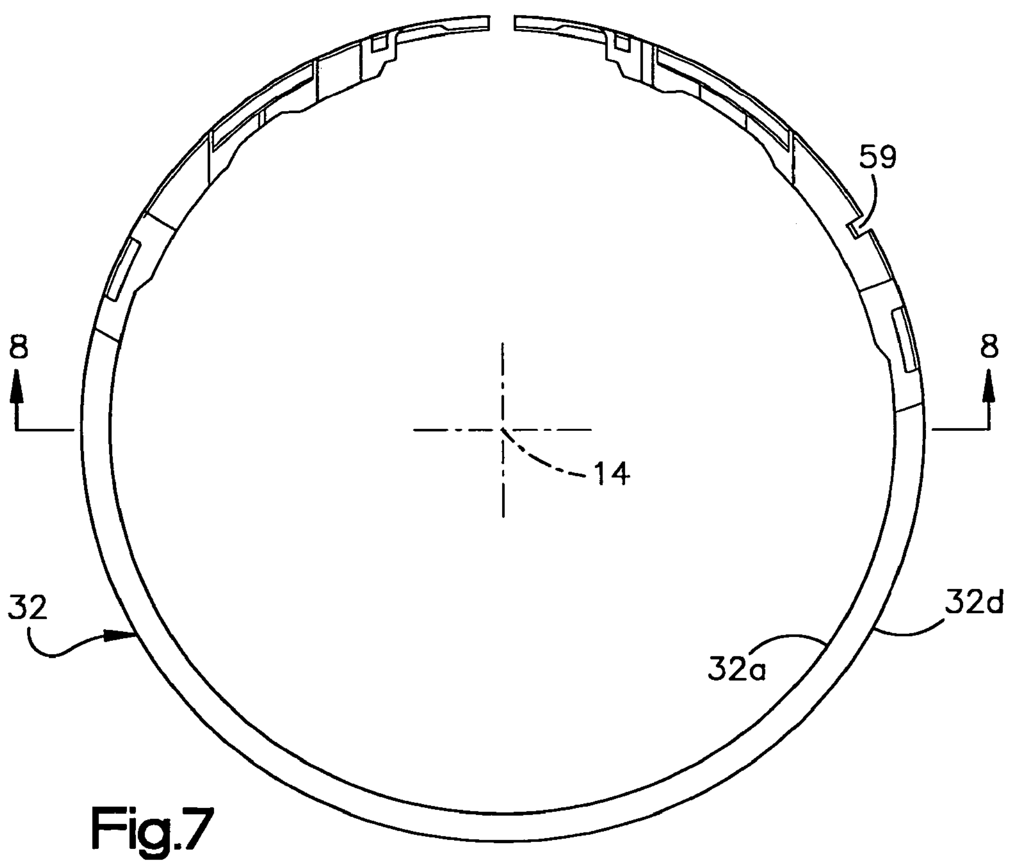
FIG. 7 is a top plan view of part of the knife illustrated in FIG. 4.

In the illustrated knife, the steel supporting body 62 is formed integrally with the clamp body and projects radially toward the blade axis 14 in the plane of the pinion gear axis of rotation 42*a* (See FIG. 5). A steel assembly guiding bore 74 extends through the body 62 about the line of action 70. The body 62 also supports the actuator 66 for movement along the line of action 72. While the supporting body 62 is illustrated formed in the same casting as the clamp body 62, the support body could as well be a separate member secured to the clamp body.

The steel assembly comprises a plunger 76 that extends through the bore 74, and a steel element 80 fixed to the plunger 76. The plunger 76 is formed by a pin 76*a* and a screw member 76*b*. The pin is generally cylindrical and extends in the bore 74 with one end connected to the element 80 and the opposite end defining a tapped hole. The screw member 76*b* has an enlarged diameter and is screwed into the pin 76*a* to form a shoulder about the plunger at the juncture of the pin and screw member.

The steel element 80 is a round button-like carbide element having a convexly curved face 80*a* confronting the blade 12. A plunger receiving hole extends through the center of the element 80. The plunger and button are bonded together, e.g. by silver soldering. The element face 80*a* is extremely hard and configured to conform to the configuration of the edge of blade section 12*a*.

The illustrated return spring 68 is a helical coil spring that is captured in the bore 74. The bore 74 is stepped to define an internal shoulder that confronts the plunger shoulder. The spring 68 surrounds the reduced diameter portion of the plunger and is disposed, in a lightly compressed condition, between the confronting shoulders so that the plunger is biased to retract the steel element from the blade. When the plunger moves to shift the steel element toward the blade, the spring 68 is further compressed.

The actuator 66 of the illustrated knife comprises a motion transmitting link 90, a manually engagable operating knob, or button, 92, and a link 94 between the link 90 and the steel assembly. The link 90 is mounted on the steel supporting body 62 for motion along the line of action 72 and normally projects from the clamp assembly in a direction away from the blade section 12*a*. The knob 92 is fixed to the projecting end of the link 90 where it can easily be engaged and pressed by the knife operator's thumb. The knife operator presses the knob 92 and shifts the link 90 in the direction of the blade section edge 12*a* without repositioning the knife in the hand.

The illustrated link 90 is formed by a stiff wire member that comprises a pair of parallel legs 90*a*, 90*b* extending between the knob 92 and the link 94. Each leg passes through a conforming guide bore in the supporting body 62 so that the link 90 is constrained for motion along the line of action 72. The knob 92 is rigidly secured to the legs. In the illustrated knife the knob 92 is formed from a plastic material that is molded onto the legs.

The link 94 is slidingly engaged with steel assembly so that when the knob 92 is depressed, the link 94 shifts along the line of action 72 while sliding at a right angle with respect to the steel assembly line of action 70. As a result, the steel assembly shifts toward the blade section edge 12*a* along its line of action 70. In the illustrated knife the link 94 is formed continuously with the wire forming the legs 90 and comprises parallel end regions of the actuator legs 90*a*, 90*b*, respectively that form a loop around the pin. The end regions are bent to extend at an obtuse angle relative to the line of action 72 so that each end region extends at 90° with respect to the line of action 70. Each end region slidably engages a pin flange on one side of the plunger so that the sliding engagement between the link 94 and the pin flange occurs on diametrically opposite sides of the plunger. The diametrically spaced engagement locations assure that the actuating forces on the steel assembly are balanced and plunger binding in the bore 74 is avoided.

When the blade section edge 12*a* has been steeled, the knob 92 is released and the return spring 68 returns both the steel assembly and actuator to their initial positions. The spring 68 forces the plunger away from the blade edge along the line of action 70. The element 80 is moved against the link 94 so that the link slides on the element and shifts along the line of action 72 away from the blade.

The illustrated knife 10 further comprises a depth-of-cut controlling gage 100 that is adjustably positionable relative to the blade section 12*a*. Referring to FIGS. 1–5, the illustrated gage 100 is detachably connected to the clamp assembly 34 and may be removed if the operations to be performed by the knife do not require a cut-thickness gage. The gage 100 comprises an annular gage unit 102, and a gage mounting mechanism 104 for securing the gage unit in any one of a number of positions on the clamp assembly with the blade axis 14 aligned with the axis of the gage unit.

The gage unit 102 comprises a semicircular gage section 106 and a supporting body section 110. The body section 110 seats on the clamp assembly and supports the gage section cantilever fashion within the annulus formed by the blade 12.

The blade section 12*a* and gage section 106 are spaced radially apart relative to the axis 14 to define an annularly curved intervening space. The gage section 106 comprises a cylindrical wall 106*a* that is disposed about the axis 14 and a radially outwardly extending flange 106*b* that extends from the wall 106*a* toward the blade section 12*a*. The flange 106*b* engages meat being cut by the knife and limits the depth of cut that can be made by the knife. The meat that is cut forms slices that are no thicker than the distance between the blade edge and the outer periphery of the flange 106*b*. The body section 110 is adjustable axially relative to the blade 12 to increase or decrease the extent of the space between the blade and gage section to control the slice thickness.

The gage body section 110 is integral with the gage section 106 and defines a semicircular body that confronts the clamp assembly 34. The body section 110 defines a radial slot 112 into which the steel supporting body 62 projects. The body section 110 has shoe-like projections 114 on opposite sides of the slot 112 that extend into clamp assembly guide slots 116 that conform to the projections 114 and extend along opposite sides of the steel supporting body 62.

The gage mounting mechanism 104 comprises screws 120 and clamping plates 122 (only one of which is shown, see FIG. 4) that coact to detachably secure the gage 100 to the clamping assembly. The screws 120 freely extend through generally radially extending bores in the gage body section 110. Each bore opens in a respective shoe-like projection 114. The plates 122 arc rectangular and each defines a tapped hole for receiving a respective screw 120. Each plate lies in a respective recess formed in the associated shoe-like projection 114. The plate ends that are nearest the steel support body 62 extend into undercuts 117 that extend along the base of the projection 62 on its opposite sides. When the screws 120 that have been threaded into the plates 122 are tightened, each respective plate engages its associated undercut and clamps the gage 100 in place. Loosening the screws allows the gage to be slid along the guide slots 116 to a desired location.

As shown in FIGS. 1–4, the knife 10 also includes a conventional grease cup assembly 140, and a finger guard assembly 142. The grease cup assembly is screwed into a tapped hole in the head member and supplies lubricant to the pinion gear area via passages in the head member. The finger guard assembly 142 has a finger guard in the shape of a curved angle iron fixed to the head member adjacent the blade section edge 12*a*. One flange of the finger guard depends from the head member to minimize the possibility of the knife operator's fingers slipping along the handle assembly 20 and engaging the knife blade. The other flange engages the head member and is held in place by a pair of mounting screws.

The handle assembly 20 comprises a core, or frame, member 150 fixed to and extending away from the blade support assembly 16, a hand grip 152 surrounding the core member 150, and a connector 154 for detachably securing the hand grip to the core member. See FIGS. 1–6. In the illustrated knife, the hand grip is removable so that a knife operator may take the hand grip away after finishing work with the knife. This enables different knife operators to have personalized handle assemblies even though several operators may use a common knife.

The illustrated core, or frame, member 150 has a first end region 160 that is attached to the blade support assembly, a second end region 162 spaced from blade support assembly, and forms a drive transmission channel for the flex shaft assembly 22*a*. In the illustrated knife the core member is fixed in the head member bore 42 and extends from the blade support assembly along the axis 42*a* of the bore 42, i.e. radially away from the blade axis 14. The illustrated core member is tubular and generally cylindrical with the drive transmission channel running through it.

The first end region is illustrated as comprising an end flange 170, an externally threaded mounting section 172, and a stepped internal bore 176. The flange 170 extends radially outwardly from the axis 42*a* and is nested in a conforming recess in the head member. The radial flange face 170*a* engages the head member recess to locate the core member relative to the head member. The core member is screwed into the head member bore 42 via the externally threaded mounting section 172 and thread tapped in the bore 42. The core member is screwed in until the flange 170 bottoms against the head member. The core member projects from the boss 40 radially away from the blade axis.

A bushing 177 is seated in the bore 176 and the pinion gear 22*b* is rotatably supported in the bushing with the pinion gear wheel disposed adjacent the flange 170.

The second end region 162 is illustrated as a cylindrical wall 178 surrounding a bore 180 on the axis 42*a* that opens to the bore section 176. The core member second end region terminates remote from the head member. The bore 180 serves to guide the flex shaft assembly 22*a* into the bore section 176 for engagement with the pinion gear 22*b*.

The hand grip 152 is illustrated as a generally tubular member 181 surrounding the core member 150, and a gripping element 182 molded over the member 181. The hand grip has a first end region 183 proximal the blade support assembly and a second end region 184 proximal the second core end region 162. The first end region 183 is constructed and arranged so that the hand grip 152 can be secured to the core member end region 160 at any of a number of angular positions about the bore axis 42*a*. For this purpose, the illustrated core member 150 is provided with an external splined section 186 that projects from the boss 40 and the end region 183 is constructed to interfit with the core splines 186. In the illustrated hand grip body 181 the end region 183 is provided with four keys, or internal spline teeth, 188—only one of which is shown—that project radially inwardly from the inner face of the hand grip. These keys conform to the external spline teeth on the core member so that the handle call be positioned at virtually any desired angular position about the axis 42*a*. The illustrated hand grip body 181 is constructed from a structurally strong molded plastic material. One or more of the internal spline teeth may be formed in part by a molded-in steel wire segment if desired.

The second handgrip end region is formed by a radially outwardly extending end flange (see FIGS. 1–3 and 14). The end flange 190 serves to anchor a hand strap to the knife 10 and therefore has a substantial radial height. As shown, the flange 190 defines a number of radially spaced apart, circumferentially extending slots 192 that can receive and anchor one end of a hand strap. The hand strap end is threaded through adjacent slots to secure the strap in an adjusted position. The opposite strap end is suitably secured to the grease cup. The strap is not shown.

The gripping element 182 is molded over the exterior of the hand grip body from the base of tie flange 190 to the end region 183. The gripping element 182 is formed from a resilient rubber-like material and is ergonometrically contoured to fit a knife operator's hand. Axially extending bands 196 of cleat-like projections are molded into the element 182 to minimize the chances of the knife slipping in the operator's hand. The cleat bands and the operator hand gripping area terminate well short of the end flange 190. The ergonomic design of the handle dictates that operator's hand be located close to the head member and away from the flange.

The connector 154 detachably secures the hand grip 152 to the core member 150. The illustrated connector is manually operated by the knife operator without need for hand tools and permits quick removal and replacement of the hand grip 152. Referring to FIGS. 1–3 and 13, the illustrated connector is a nut-like member having a hand-grippable annular body 200, a cylindrical section 202 projecting from the body 200 into the hand grip, and a bore 204 extending through the connector in alignment with the axis 42*a*. The section of the bore 204 extending in the cylindrical section 202 is tapped so that, after the hand grip 152 is assembled to the core member 150, the connector can be inserted into the hand grip end region 184 and screwed onto an external screw thread 206 formed on the core member end region 162.

The threaded core member end region 162 is constructed with four axial slots extending through the thread 206 so that the keys, or spline teeth, in the hand grip end region 183 can move past the threaded end region 162 as the hand grip 152 is installed on a knife.

The body 200 has an outer diametrical extent that is greater than the inside diameter of the flange 190 and defines a radially inwardly converging frustoconical face 210 that extends from the outer periphery of the body 200 to the cylindrical section 202. The face 210 conforms to a frustoconical face 212 on the handgrip that extends from the end face of the flange 190 to the hand grip bore 180. When the connector 154 is screwed onto the core member 150, the face 210 engages the face 212 to both clamp the hand grip 152 in its assembled position and center the hand grip on the axis 42*a*. The illustrated connector 154 defines finger gripping recesses 214 spaced about the outer periphery of the body 200 to assure that the connector can be tightly screwed in place by hand.

The illustrated flex shaft assembly 22*a* is constructed so that it can be detachably connected to the knife 10 without drivingly engaging the pinion gear 22*b*. The flex shaft assembly is constructed from a flexible casing 220, a flexible shaft 222 rotatably disposed in the casing, a knife connecting end assembly 224 that surrounds the flex shaft end, a rotatable pinion driving member 226 projecting from the end assembly 224, and drive disconnecting spring 228 that surrounds part of the end assembly 224.

The casing and flex shaft may be of any suitable or conventional construction and therefore are not described further. Suffice it to say that the shaft and casing extend between the knife 10 and a driving motor that is remote from the knife and operates to constantly drive the flex shaft within the casing.

The knife connecting end assembly 224 is fixed on the end of the casing 220 and surrounds the terminus of the flex shaft adjacent the knife 10. The end assembly comprises a tubular cylindrical guide member 230 that is fixed with respect to the casing 220, a support member 232 fixed to the guide member 230, and a latching collar 234 between the end of the casing 220 and the guide member 230.

The guide member 230 and the support member 232 are fixed with respect to the casing and support rotating elements within them. The member 230 has an outer diameter that closely conforms to the inner diameter of the core member 150 so that when the flex shaft assembly is inserted into the knife handle, the member 230 accurately guides the pinion driving member toward a position for driving the pinion gear 22*b*. The guide member 230 has a larger diameter than the support member 232 so a shoulder 236 is formed by their juncture. The support member 232 rotatably supports the pinion driving member 226, with the latter projecting from the support member.

When the flex shaft assembly is connected to the knife 10 the end assembly 224 is disposed within the core member 150. The disconnect spring 228 is a relatively strong helical spring that surrounds the support member 232 and is compressed between the shoulder 236 and an internal shoulder in the core member bore 180. The spring 228 biases the end assembly 224 in a direction away from the pinion gear 22*b*.

The illustrated latching collar 234 is constructed and arranged to maintain the flex shaft assembly attached to the knife 10 both in a condition where the blade is driven and where the blade is not driven. The illustrated latching collar comprises a latching ring 240 that is integral with the collar and functions to latch the flex shaft assembly to the knife in the drive disconnected mode, and a lever mechanism 242 for use in connecting the blade to the drive.

In the illustrated knife 10 the connector 154 serves not only to secure the hand grip 152 to the knife, but also to detachably secure the flex shaft assembly 22*a* to the knife and to enable engagement and disengagement of the flex shaft assembly and the pinion gear 22*b*. The illustrated connector 154 is constructed and arranged to include a latching assembly 246 in the body 200 (see FIG. 13). The latching assembly comprises a latching plate 250 supported in a slot 251 that extends into the body 200 transverse to the axis 42*a*, springs 252, and a retainer pin 254 that secures the plate 250 in the body 200. The plate is generally planar and has a circular opening 256 that conforms to the connector bore 204. One plate end 257 projects from the slot 251 while the opposite plate end 258 extends toward the closed slot end beyond the connector bore 204. The springs 252 are disposed between the base of the slot and the adjacent plate end 258. In the illustrated mechanism, the springs 252 are small helical coil springs that are compressed between the slot base and the plate and urge the plate to a position where part of the plate opening 256 is misaligned with, and partially obstructs, the connector bore 204. The retainer pin 254 extends into the body 200 through the slot 251 and an elongated slot 260 in the plate. The retainer pin 254 engages one end of the slot 260 to prevent the plate from being displaced from the slot 251 by the springs 252.

When the flex shaft assembly is inserted into the knife handle, the flex shaft assembly is thrust into the knife handle so that the shaft end assembly 224 moves into the handle bore 180 and the disconnect spring 228 is compressed. As the collar 234 enters the connector bore 204 the latching ring 240 is forced in to engagement with the plate 250. The leading side of the latching ring is frustoconical and as it moves into the bore 204 it wedges the plate 250 toward the bottom of the slot 251 against the springs 252. When the latching ring passes the plate, the springs 252 force the plate to its initial position where it again partly obstructs the bore 204. The trailing side of the latching ring is planar and extends radially relative to the axis 42*a* so that, when the flex shaft assembly tends to be withdrawn from the knife, the plate 250 and latching ring trailing side engage and prevent removal. When the latch plate 250 and the latching ring 240 are engaged as described, the flex shaft assembly and pinion gear are not drivingly connected. Thus, the flex shaft assembly may be latched to the knife handle without driving the blade.

The lever mechanism 242 enables the flex shaft assembly to be drivingly connected to, and disconnected from, the knife blade under the control of the knife operator. The mechanism 242 comprises a pivot pin 262 connected to the collar 234 and a lever 264 movable about the pivot pin for moving the flex shaft assembly to and away from the connected position. The illustrated pivot pin 262 is integral with the collar and connected to the collar by legs 266. The legs project away from the collar so that the pin is supported with its axis extending at right angles to the plane of the axis 42*a* and is spaced laterally away from the axis 42*a*.

The illustrated lever 264 is an elongated sheet metal member that is bent to form a semi-cylindrical bearing section 270 that engages the pivot pin 262, a cam face 272, and an arm section 274 that projects away from the cam face along the knife handle.

When the flex shaft assembly is latched to the knife and the operator decides to engage the flex shaft assembly with the blade, the lever arm section 274 is aligned with a slot 276 formed in the hand grip flange 190 and the flex shaft assembly 22*a* is manually thrust fully into the handle bore 1 80 until the cam face 272 is located adjacent the connector face 210. The collar and flex shaft end assembly shift further into the handle to connect the end assembly with the pinion gear. The lever arm section 274 moves freely into proximity with the hand grip 152, as illustrated in FIG. 3. The operator squeezes the lever arm section against the hand grip. The cam face 272 engages the connector face 210. The disconnect spring 228 is further compressed as the end assembly 224 moves into the handle so the end assembly is biased away from the connected position.

So long as the operator continues to grip the knife handle and lever arm section 274, the flex shaft assembly and the pinion gear remain connected. When the operator releases the lever arm, the disconnect spring 228 forces the end assembly away from its connected position until the latch plate 250 and the latching ring 240 re-engage with the flex shaft assembly in its disconnected position, but latched to the knife. The lever cam face 272 rides along the frusto-conical connector face 212 assuring that the lever arm section is separated from the handle and does not impede the disconnecting motion of the end assembly.

The latching assembly is manually operable to enable removal of the flex shaft assembly from the knife. In the illustrated knife, the knife operator depresses the plate end 257 by finger pressure to align the plate opening 256 with the connector bore 204 against the spring force. The flex shaft drive end is withdrawn through the bore 204 and aligned opening 256 without interference.

Figure 15:
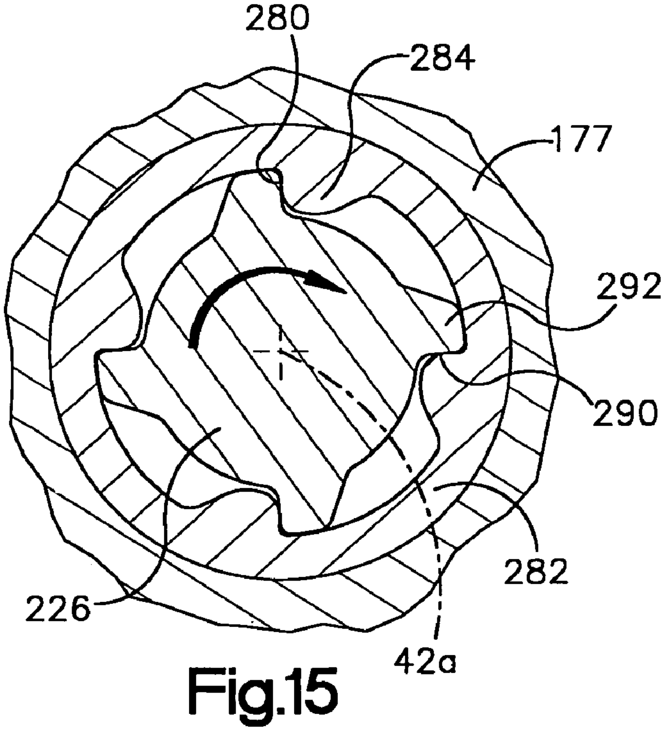

The drive coupling arrangement for transmitting drive from the flex shaft assembly to the pinion gear is so constructed and arranged that the force exerted on the end assembly by the disconnect spring 228 is more than sufficient to separate the pinion gear 22*b* from the pinion driving member 226. Referring to FIGS. 2, 3, 5 and 15, drive transmitting surfaces 280, fixed with respect to the pinion gear, extend generally in the direction of the axis 42*a*, with at least a portion of each drive transmitting surface disposed on a radial line passing substantially through the axis. In the illustrated knife the pinion gear is formed with a hollow supporting shaft 282 that is rotatable in the bearing 177 (FIG. 15). The drive transmitting surfaces 280 are formed on respective lobe-like projections 284 that extend radially inwardly from the inner surface of the pinion shaft 282. In the illustrated knife, four equally spaced projections are disposed about the axis 42*a*. The projections extend circumferentially a relatively short distance about the axis 42*a* so that they are spaced relatively widely apart.

The rotatable pinion driving member 226 defines drive transmitting surfaces 290 engaging respective drive transmitting surfaces 280 on the pinion gear. Each surface 290 engages a surface 280 along at least part of its axial extent. The drive transmitting surfaces have at least a portion disposed on a radial line passing substantially through the axis 42*a* when the drive transmitting surfaces 280, 290 are engaged. In the illustrated knife, the pinion driving member 226 has a generally cylindrical body and the drive transmitting surfaces 290 are formed on lobe-like projections 292 that extend radially away from the body. There are four projections 292 and when the end assembly and pinion gear are connected, the projections 292 move axially into the spaces between the pinion shalt projections 284 and into driving engagement with the surfaces 280.

The disconnect spring 228 biases the surfaces 280, 290 away from engagement with each other in that the spring 228 urges the surfaces 290 in a direction axially out of the pinion shaft 282. The lever mechanism 242, when gripped by the knife operator, is effective to overcome the disconnect spring bias and maintain the driving member within the pinion shaft 282; but when the lever mechanism is no longer gripped, the spring force disconnects the drive surfaces.

The radially extending drive transmitting surfaces 280, 290 engage with the driving forces transmitted between them along lines of action that have no component extending radially with respect to the axis 42*a*. The result is that the frictional forces resisting separation of the drive surfaces are minimized for any given amount of torque transmission.

This is to be contrasted with other forms of drive connection where, for example, a square cross section drive transmitting member is inserted into a square hole in a pinion shaft. In that case, the force transmitted between engaged driving faces is along a line of action having a radial component and a component normal to the radial component. The frictional forces between the engaged faces are proportional to the resultant force transmitted by the faces. These frictional forces are larger than the frictional forces attributable to the component forces.

The illustrated knife 10 employs a lever mechanism 242 for use in connecting and disconnecting the flex shaft assembly and pinion gear; but other constructions can be employed. For example, the collar 234 can be provided with a second latching ring—constructed like the latching ring 240—in place of the lever mechanism. In such an arrangement, the flex shaft assembly is thrust into the bore 204 and latched in the disconnected position as described above. When the operator decides to connect the flex shaft assembly to the pinion gear, the shall assembly is thrust further into the bore 204 until the second latching ring has passed the latching plate 250. The latching plate 250 and the second latching ring coact just like the latching plate and latching ring 250 so that the flex shaft assembly is latched to the knife in its connected position. When the knife operator wishes to disconnect the flex shaft assembly the latching plate is depressed to unlatch the second latching ring.

While only a single embodiment of the invention has been illustrated and described, various adaptations, modifications, and uses of the invention may occur to those skilled in the art to which the invention relates. The intention is to cover hereby, all such adaptations, modifications, and uses that fall within the scope or spirit of the appended claims.

What is claimed is:

1. A rotary knife comprising:

an annular blade having a central axis and an edge defined at one axial blade end;

a blade support assembly supporting said blade for rotation about said axis; and, a handle assembly connected to said blade support assembly;

said handle assembly comprising a manually grippable handle, and said blade support comprising a head member extending circumferentially partially about said blade and defining a radially inner peripheral portion and a radially outer portion, said handle projecting away from said radially outer portion;

said blade support assembly comprising an annular blade supporting member having a split housing and a clamping assembly for securing said blade supporting member to said head member, the split housing of the blade supporting member allowing resilient expansion for removing the blade from the blade supporting member;

said clamping assembly comprising a clamp member and fasteners for securing said clamp member to said head member, said clamp member disposed along an inner periphery of the split housing of said blade supporting member and said blade and confronting said head member with the split housing of said blade supporting member interposed therebetween, said fasteners reacting against said radially outer portion to draw said clamp member into clamping engagement with the split housing of said blade supporting member such that selectively reducing the clamping force at one of the fasteners permits expanding the split housing to facilitate removal of the blade from the blade supporting member while the split housing remains firmly assembled to and positioned on the head member.

2. A housing for an annular power operated knife blade, the housing comprising:

a. an annular, split body defining a central axis and having a radially inner blade supporting section, a radially outer face extending circumferentially about the body, and a body mounting structure extending circumferentially partially about said body on opposite sides of the split in said body;

b. said body mounting structure defining first and second axially extending projections disposed on one side of the split in said body, and third and fourth axially extending projections disposed on the other side of said split, each projection extending axially from the blade supporting section to a distal end, each projection defining a radially outwardly facing circumferentially extending bearing face and a circumferentially extending radially outwardly opening groove extending between the respective bearing face and said radially outer face, said projection bearing faces extending parallel to said radially outer face;

c. a first housing mounting slot defined between said first and second projections, said first mounting slot opening between the distal ends of said first and second projections and extending axially in said mounting structure to a location substantially adjacent said radially outer face;

d. a second housing mounting slot defined between said third and fourth protections, said second mounting slot opening between the distal ends of said third and forth projections and extending axially in said mounting structure to a location substantially adjacent said radially outer face;

e. said radially outer face defining a housing body bearing face extending circumferentially along said body mounting structure, said housing body bearing face spaced axially from said projection bearing faces with said groove disposed axially therebetween;

f. an inner bearing face extending circumferentially along the radially inner side of said body mounting structure, said inner bearing face located axially between said blade supporting section and said distal ends of said projections, said inner bearing face being axially narrow compared to the axial extent of either said housing body or said projecting bearing faces;

g. said inner bearing face constructed and arranged so that clamping force applied to said inner bearing face is transmitted radially and axially through the blade housing to the housing body bearing face and said projection bearing faces for securely clamping said blade housing in place.

3. The blade housing claimed in claim 2 mounted to a blade housing supporting head by a housing clap assembly, said head comprising:

a) a plurality of circumferentially spaced clamp faces each circularly curved about said axis and engaging a respective projection bearing face;

b) a circumferentially extending clamp face circularly curved about said axis and engaging said housing body bearing face; and, c) first and second socket aligned with said first and second housing mounting slots.

4. The blade housing claimed in claim 3 wherein said clamp assembly comprises a clamp member and first and second connectors, said clamp member defining first and second circumferentially extending clamping faces engaging said inner bearing face and first and second bosses respectively extending through said first and second housing mounting slots and into said first and second sockets.

5. The blade housing claimed in claim 2 further comprising a tool engaging slot formed in said radially outer face, said tool engaging slot disposed circumferentially adjacent said housing body bearing face.

6. A rotary knife comprising:

a) an annular blade having a central axis and an edge at one axial end;

b) a blade support assembly;

c) a handle assembly connected to said blade support assembly;

d) a drive transmission for rotating said blade about said axis; and e) a steeling mechanism;

f) said steeling mechanism comprising a steel, a steel support that supports said steel for movement toward and away from engagement with said blade along a first line of action, and a manually shiftable steel actuator member supported for movement relative to said handle assembly along a second line of action that is neither parallel to, nor coextends with, said first line of action, said steel actuator member operatively coupled to the steel support such that when the steel actuator member is moved in a downward direction with respect to the handle assembly along said second line of action, said steel is moved along said first line of action into engagement with the blade.

7. A rotary knife having an annular rotary blade, a blade supporting assembly, a handle, and a blade drive transmission for effecting blade rotation, said transmission comprising:

a) a flexible drive shaft unit extending to a location adjacent said blade;

b) a blade driving output member rotatable about an axis;

c) a drive coupling arrangement for transmitting drive from said drive shaft unit to said output member, said coupling arrangement comprising:

a first drive transmitting surface fixed with respect to said output member and extending generally in the direction of said axis, at least a portion of said first drive transmitting surface disposed on a radial line passing through said axis;

a second drive transmitting surface drivingly connected to said drive shaft unit, said second drive transmitting surface engaging said first drive transmitting surface along at least part of its axial extent, said second drive transmitting surface having at least a portion thereof disposed on a radial line passing through said axis when said first and second drive transmitting surfaces are engaged;

one of said first and second drive transmitting surfaces biased away from engagement with the other; and a mechanism for overcoming the bias and maintaining said drive transmitting surfaces engaged.

* * * * *